United States Patent [19]
Nielsen

[11] Patent Number: 6,003,046
[45] Date of Patent: Dec. 14, 1999

[54] AUTOMATIC DEVELOPMENT AND DISPLAY OF CONTEXT INFORMATION IN STRUCTURED DOCUMENTS ON THE WORLD WIDE WEB

[75] Inventor: Jakob Nielsen, Atherton, Calif.

[73] Assignee: Sun Microsystems, Inc., Mountain View, Calif.

[21] Appl. No.: 08/633,915

[22] Filed: Apr. 15, 1996

[51] Int. Cl.$^6$ .................................................. G06F 17/21
[52] U.S. Cl. ........................ 707/513; 707/500; 707/514
[58] Field of Search ..................................... 395/762, 774, 395/776, 777, 200.32, 200.33, 200.48; 345/350, 326; 399/350; 707/500, 501, 513, 514, 104

[56] References Cited

U.S. PATENT DOCUMENTS

| | | | |
|---|---|---|---|
| 5,072,412 | 12/1991 | Henderson, Jr. et al. | 395/159 |
| 5,499,329 | 3/1996 | Motoyama et al. | 707/513 |
| 5,530,852 | 6/1996 | Meske, Jr. et al. | 707/513 |
| 5,546,517 | 8/1996 | Marks et al. | 707/501 |
| 5,557,722 | 9/1996 | DeRose et al. | 395/148 |
| 5,615,325 | 3/1997 | Peden | 345/326 |
| 5,619,632 | 4/1997 | Lamping et al. | 395/141 |
| 5,632,022 | 5/1997 | Warren et al. | 395/350 |
| 5,644,776 | 7/1997 | DeRose et al. | 395/761 |
| 5,649,186 | 7/1997 | Ferguson | 707/10 |
| 5,724,595 | 3/1998 | Gentner | 345/335 X |
| 5,745,360 | 4/1998 | Leone et al. | 707/513 |
| 5,749,080 | 5/1998 | Matsumoto et al. | 707/514 X |
| 5,758,361 | 5/1998 | Van Hoff | 707/513 |
| 5,793,966 | 8/1998 | Amstein et al. | 395/200.33 |
| 5,801,702 | 9/1998 | Dolan et al. | 345/357 |
| 5,818,446 | 10/1998 | Bertram et al. | 345/334 |
| 5,826,258 | 10/1998 | Gupta et al. | 707/4 |
| 5,845,299 | 12/1998 | Arora et al. | 707/513 |
| 5,848,407 | 12/1998 | Ishikawa et al. | 707/2 |

OTHER PUBLICATIONS

Grunin, "Electronic Publishing: Publish Without Paper," PC Magazine, Feb., 1995, pp. 110–171.

Furuta, et al., "Interactively editing structured documents," Electronic Publishing, vol. 1(1), Apr., 1988, pp. 18–44.

Bederson et al. "A Zooming Web Browser," *Multimedia Computing and Networking*, Proceedings of the SPIE—The International Society for Optical Engineering, San Jose, CA (Jan. 29–31, 1996).

Brooks et al., "Application–Specific Proxy Servers as HTTP Stream Transducers," *Fourth International World Wide Web Conference*, Boston, pp. 1–9 (Dec. 1995).

Domel, "WebMap: a graphical hypertext navigation tool," *Computer Networks and ISDN Systems*, vol. 28, No. 1(02), pp. 85–97 (Dec. 1, 1995).

Mukherjea et al, "Visualizing Complex Hypermedia Networks through Multiple Hierarchical Views," *Human Factors In Computing Systems*, Chi '95 Conference Proceedings, Denver, pp. 331–337 (May 11, 1995).

"Generalized Fisheye Views", George W. Furnas, CHI '86 Proceedings, pp. 16 through 23 (Association for Computing Machinery 1986).

*Primary Examiner*—Stephen S. Hong
*Assistant Examiner*—Robert D Bourque
*Attorney, Agent, or Firm*—Townsend and Townsend and Crew LLP

[57] ABSTRACT

A system for retrieving a selected page of a structured document and for automatically developing context information about the selected page. This context information may include a table of contents showing the location of the selected hypertext page in relationship to other hypertext pages. In one embodiment, this context information is inserted into the hypertext page. The so-modified hypertext page may then be transmitted to a remote location for display. Since the context information is automatically developed after retrieval, it need not be manually generated and maintained. For WWW applications, the hypertext page with the context information inserted remains in the HTML format viewable by standard browsers. A powerful and convenient system for browsing through structured documents is thus provided.

26 Claims, 5 Drawing Sheets

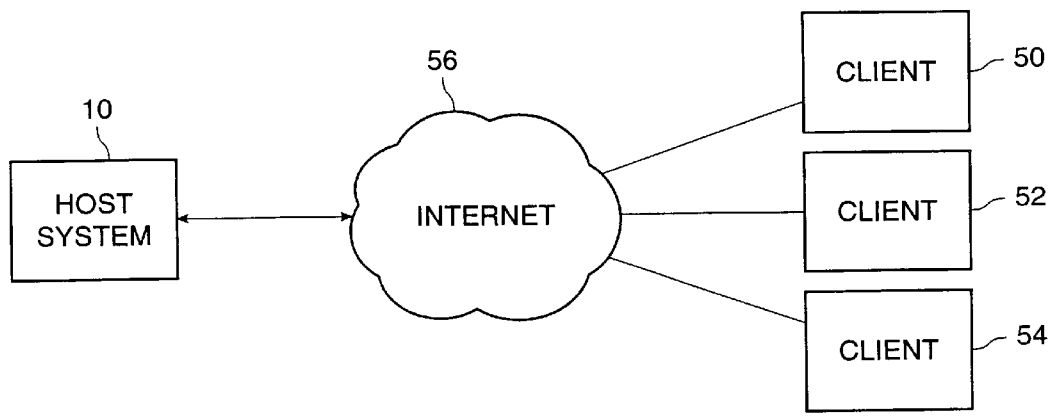

FIG. 1B

```
300
  ↘
   302
     ↘
208   <PRE>                                                          208
   ↘  <A HREF=http://sunweb.ebay/sunweb/orgs>                        ╱
      ↘Sun Microsystems</A>
208   <BR>    <A HREF=http://sunweb.ebay/sunweb/orgs/sunsoft>SunSoft</A>
   ↘  <BR>        <A HREF=http://sunweb.ebay/sunweb/orgs/sunsoft/spg>
      ↘Solaris Products Group</A>
      <BR>            <A HREF=http://sunweb.ebay/sunweb/orgs/sunsoft/spg/sto>
     ╱Strategic Technology Office</A>                              210    210
      <BR>            <A HREF=http://hugin.eng/drbob.html>Bob Glass</A>  ╱
208   <BR>            <STRONG>Jakob Nielsen</STRONG>                  ╱
      <BR>            <A HREF=http://hugin.eng/tog.html>Bruce 'Tog' Tognazzini</A>
     ╱</PRE>
      <HR>                      204
304   <P>
```

FIG. 3

Jakob Nielsen's Homepage

Info about Jakob Nielsen

WWW User Interface Design

- Sun's new WWW pages.
- User interface design for Sun's new WWW pages.
- How we designed SunWeb

Other Projects

- World Without Windows (currently no info available)
- The Anti-Mac user interface
- Starfire Pages on the WWW
- Sherlock (new release of AnswerBook)
- Monthly Alert Box column

US 6,003,046

AUTOMATIC DEVELOPMENT AND DISPLAY OF CONTEXT INFORMATION IN STRUCTURED DOCUMENTS ON THE WORLD WIDE WEB

BACKGROUND OF THE INVENTION

The present invention relates to the presentation of structured documents in a hypertext browsing system and more particularly to the presentation of context information for a hypertext page.

Most technical documentation incorporates a hierarchical structure of chapters, sections, subsections, etc. It is known that systems for on-line browsing of structured documents operate most effectively when the user can see where currently displayed information is located within the hierarchy.

Accordingly structured document viewing interfaces have been developed that display two panes, a first pane showing information desired by the user and a second pane showing a table of contents. The location of the information shown in the first pane is highlighted in the table of contents. The highlighted location must of course be updated every time new information is displayed in the first pane. Since the table of contents must be generated in advance for each page of information displayable in the first pane, it is normally very simplified, showing only the largest divisions of the structured document.

It is desirable however to display context information for very large structured documents including many pages and to particularize the context information for each page. It is also desirable that the context information be more detailed than a simple list of the major divisions of the structured document. Generating this information manually presents various problems. The large number of pages means that many man-hours are required to generate the context information for each page. Furthermore, structured documents are frequently updated with additions, deletions, and modifications of pages. These updates render previously generated table-of-contents information obsolete.

Further problems arise in considering the presentation of structured documents across the World Wide Web (WWW) or other network-based hypertext browsing environments. The operator of a web site storing a structured document cannot assume that all users are operating a hypertext browser that provides multiple pane displays.

SUMMARY OF THE INVENTION

By virtue of the present invention, a system is provided for retrieving a selected page of a structured document and for automatically developing context information about the selected page. This context information may include a table of contents showing the location of the selected hypertext page in relationship to other hypertext pages. In one embodiment, this context information is inserted into the hypertext page. The so-modified hypertext page may then be transmitted to a remote location for display. Since the context information is automatically developed after retrieval, it need not be manually generated and maintained. For WWW applications, the hypertext page with the context information inserted remains in the HTML format viewable by standard browsers. The present invention thus provides a powerful and convenient system for browsing through structured documents.

In one embodiment, the table-of-contents information is presented in a "fisheye" view at the top of the hypertext page. For a WWW application, when a user requests a page of the structured document, the system concatenates the HTML source for that page with a fisheye view of the table-of-contents. The resulting string of HTML text is sent over a network to the user's web browser where it may be displayed.

The table-of-contents display may include the names of other pages of the structured document. One aspect of the present invention provides many possible techniques for obtaining these names. For example, a table-of-contents database may be maintained including these names. The names could be retrieved from the HTML title or heading tags of the pages. Also, the filename of a page could be used as the name.

In one embodiment, the structured document has a tree structure. A single root page has one or more children pages which in turn have one or more children and so on. The fisheye table-of-contents view shows the names of each parent of the presently displayed page up until the root page as well as the names of "sibling" pages, i.e., pages that share a common first generation parent.

Another aspect of the present invention provides many techniques for determining the parents of a selected page. For example, the parents of a particular page may be determined by consulting a table-of-contents database. Alternatively, each page may include a special tag identifying at least its first generation parent. If the pages are stored within a hierarchical file system, the parent could be defined as the file stored in the same directory as the page with a special filename such as "index.html". If there is no such file, the parent directory of the directory holding the selected page is searched for such a file. If the parent directory has no such file, the first file in the parent directory having a particular suffix, such as ".html" is identified as the parent page. Otherwise, the selected page is determined to be the root page.

A further understanding of the nature and advantages of the inventions herein may be realized by reference to the remaining portions of the specification and the attached drawings.

BRIEF DESCRIPTION OF THE DRAWINGS

FIG. 1B depicts the interconnection of the host computer system to remote clients.

FIG. 3 is a segment of HTML code inserted to generate the table-of-contents of FIG. 2.

DESCRIPTION OF SPECIFIC EMBODIMENTS

Figure 1A:
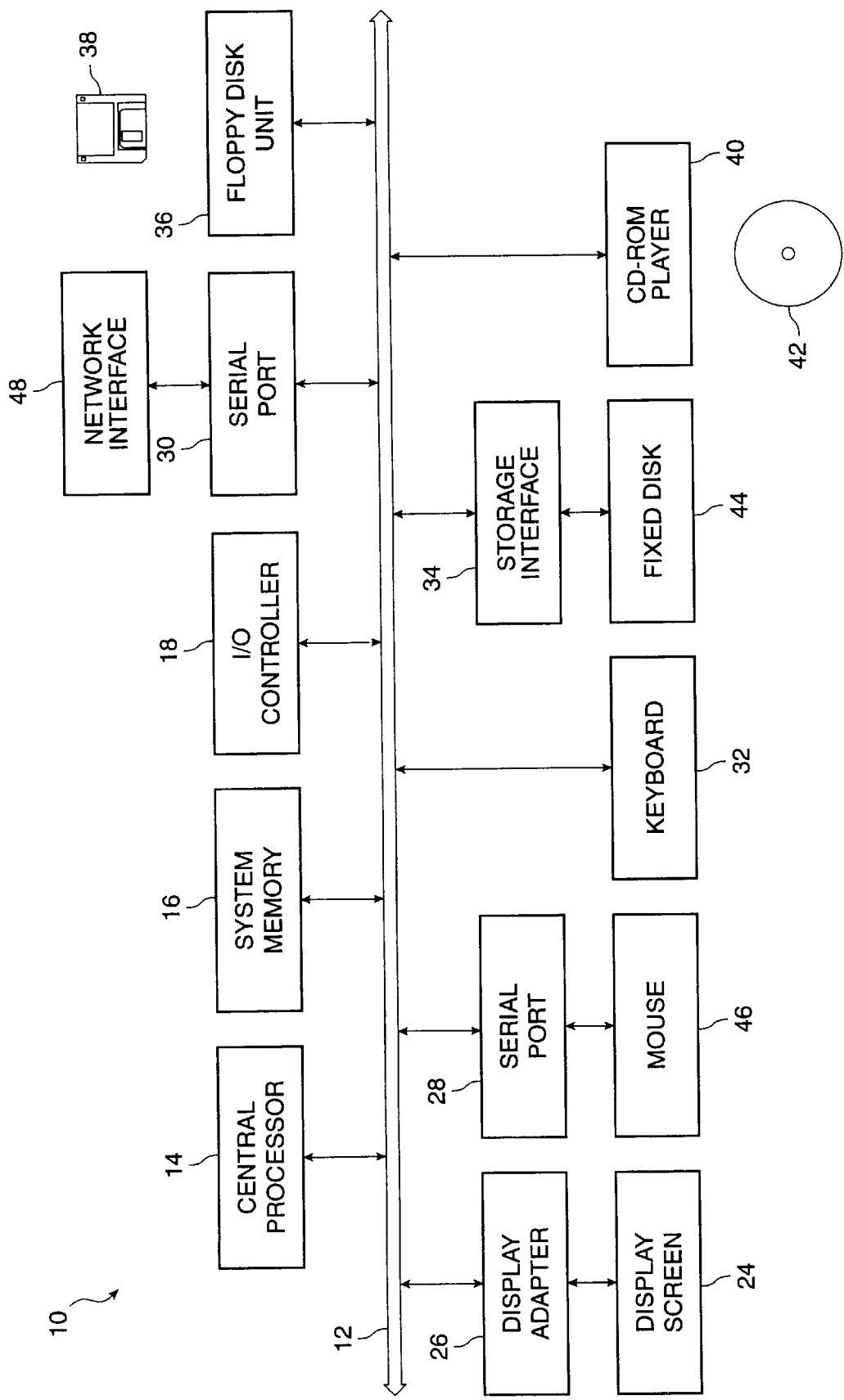
FIG. 1A depicts a block diagram of a host computer system suitable for implementing the present invention.

FIG. 1A depicts a block diagram of a host computer system 10 suitable for implementing the present invention. Host computer system 10 includes a bus 12 which interconnects major subsystems such as a central processor 14, a system memory 16 (typically RAM), an input/output (I/O) controller 18, an external device such as a display screen 24 via display adapter 26, serial ports 28 and 30, a keyboard 32, a storage interface 34, a floppy disk drive 36 operative to receive a floppy disk 38, and a CD-ROM player 40 operative to receive a CD-ROM 42. Storage interface 34 may connect to a fixed disk drive 44. Fixed disk drive 44 may be a part of host computer system 10 or may be separate and accessed through other interface systems. Many other devices can be connected such as a mouse 46 connected via serial port 28 and a network interface 48 connected via serial port 30. Network interface 48 may provide a direct connection to a remote server via a telephone link or to the Internet via a POP (point of presence). Many other devices or subsystems (not shown) may be connected in a similar manner.

Also, it is not necessary for all of the devices shown in FIG. 1A to be present to practice the present invention, as discussed below. The devices and subsystems may be interconnected in different ways from that shown in FIG. 1A. The operation of a computer system such as that shown in FIG. 1A is readily known in the art and is not discussed in detail in this application. Code to implement the present invention may be operably disposed or stored in computer-readable storage media such as system memory 16, fixed disk 44, CD-ROM 42, or floppy disk 38.

FIG. 1B depicts the interconnection of host computer system 10 to client systems 50, 52, and 54. FIG. 1B depicts the Internet 56 interconnecting client systems 50, 52, and 54. Modem 48 or some other network interface provides the connection from host computer system 10 to the Internet 56. Protocols for exchanging data via the Internet are well known and need not be discussed herein. Although FIG. 1B depicts the use of the Internet for exchanging data, the present invention is not limited to the Internet or any network-based environment for that matter.

In one embodiment of the present invention, host computer system 10 has access to a structured document via storage interface 34. The structured document includes many pages, each typically stored in a separate file. For WWW applications, an HTTP server operates on host computer system 10 and these files are typically in HTML format. The document has a tree structure with a single root page that has one or more child pages. Each child page in turn may have one or more children of its own. Thus, each page in the structured document can trace its ancestry to the root through one or more parents. Many pages in the structured document may have siblings, that is other pages that share a common first generation parent.

This structure is merely representative and other structures may be accommodated within the scope of the present invention. One could accommodate associative structures with typed links between information objects. For example, a geographic information structure might have links of the type "nearby" to indicate location and links of types "designed-by" and "has-designed" to connect buildings to architects and architects to buildings.

Client systems 50, 52, and 54 operate hypertext browsers configured to access host computer system 10 over the Internet 18 and to retrieve selected pages of the structured document for local display. One aspect of the present invention provides automatic generation of context information at host system 10 for a selected page. The context information may then be inserted into the page prior to transmission to the requesting client system.

Figure 2:
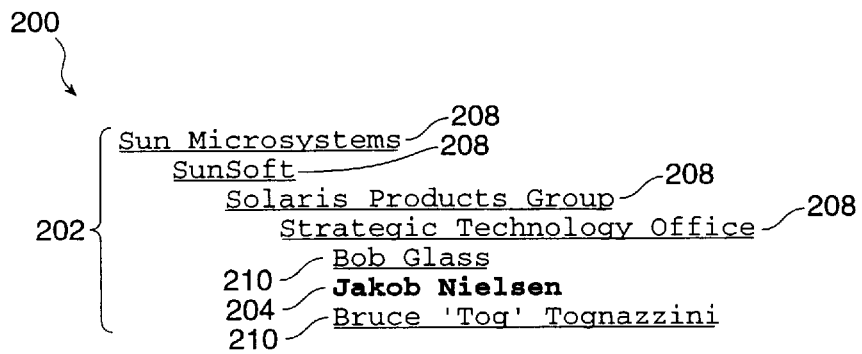
FIG. 2 is a hypertext page display modified in accordance with one embodiment of the present invention to include a "fisheye" table-of-contents.

One type of context information that may be provided within the scope of the present invention is a so-called "fisheye" view of the table-of-contents of the structured document as explained below. A fisheye view is one that combines local detail with global context. FIG. 2 is a hypertext page display 200 modified in accordance with one embodiment of the present invention to include a fisheye table-of-contents 202. Display 200 shows the inventor's home page on the WWW which is one page in a structured document.

Table-of-contents 202 includes a list of names including a name 204 of the currently displayed page, names 208 of parent pages of the currently displayed page, and names 210 of other pages having the same first generation parent as the currently displayed page, i.e., sibling pages. Name 204 appears in bold print to signify that it represents the currently displayed page. Names 208 and 210 appear as highlighted links that when activated take the user to the identified pages.

The indentation of entries in table-of-contents 202 helps the user rapidly assess the relationship of the displayed page to the overall document structure. "Sun Microsystems" is the rootpage and thus appears at the far left margin. Each layer of the hierarchy is indented three spaces more than the layer above it. The pages identified by names 210 and name 204 share a common first generation parent and thus appear with the same degree of indentation.

With this understanding of the indentation scheme in mind, it will be understood that the global context of the currently displayed page is apparent from table-of-contents 202 since the full chain of ancestry from the presently displayed page to the root page is shown. The names of the sibling pages clarify the local detail. Table-of-contents 202 is thus an extremely useful tool for understanding the overall structure of the document and navigating through it. When the user shifts to a new page in the structured document, he or she sees an updated table-of-contents display that reflects the context of the newly displayed page.

Table-of-contents 202 represents only one possible arrangement of context information within the scope of the present invention. For example, an alternative arrangement is to display only the chain of ancestry to the root and not the sibling pages. Another alternative arrangement is to display only a portion of the chain of ancestry but to also display all descendants of the second generation parent of the selected page.

Depending on the structure of the document, other displays could be substituted for table-of-contents 202. For example, for the geographic information structure described above, when the user is viewing a hypertext page for a particular building, the present invention may provide a display listing other buildings near the location of the particular building as well as other buildings designed by the same architect.

Host system 10 automatically generates table-of-contents 202 by concatenating appropriate HTML code with a requested page prior to transmission to the requesting client. FIG. 3 shows a segment 300 of HTML code inserted to generate table-of-contents display 202 of FIG. 2. Subsegments of segment 300 are identified with the reference designators of FIG. 2 pointing to the corresponding text produced for display. <PRE> tag 302 and </PRE> tag 304 identify the HTML code of FIG. 3 as being preformatted text. Name 204 denoting the currently displayed page is marked for <STRONG> formatting which typically appears as bold text. The remainder of the names are given within link anchor tags which include URLs of the identified pages. An explanation of HTML format for encoding web pages is found in Morris, *HTML for Fun and Profit*, (SunSoft Press 1995), the contents of which are herein expressly incorporated by reference for all purposes.

In one embodiment, a document structure database accessible to host system 10 facilitates automatic generation of the HTML code of FIG. 3. The document structure database includes for each page, information about its name, information about its parent or the fact that it is a root page, and information about its children.

Information about the parent and children of a page may also be embedded within a special HTML tag within the page. For example, the parent of a page may be indicated as <!-- META NAME="parent" VALUE="filename.html"-->. If the page has a tag <!-- META NAME="rootnode"

VALUE="thispage.html"-->, then it has no parents. The children of a page may be indicated as <!-- META NAME="child" VALUE="filename1.html"-->, <!-- META NAME="child" VALUE="filename2.html"-->, with each tag listed on a separate line.

Figure 4:
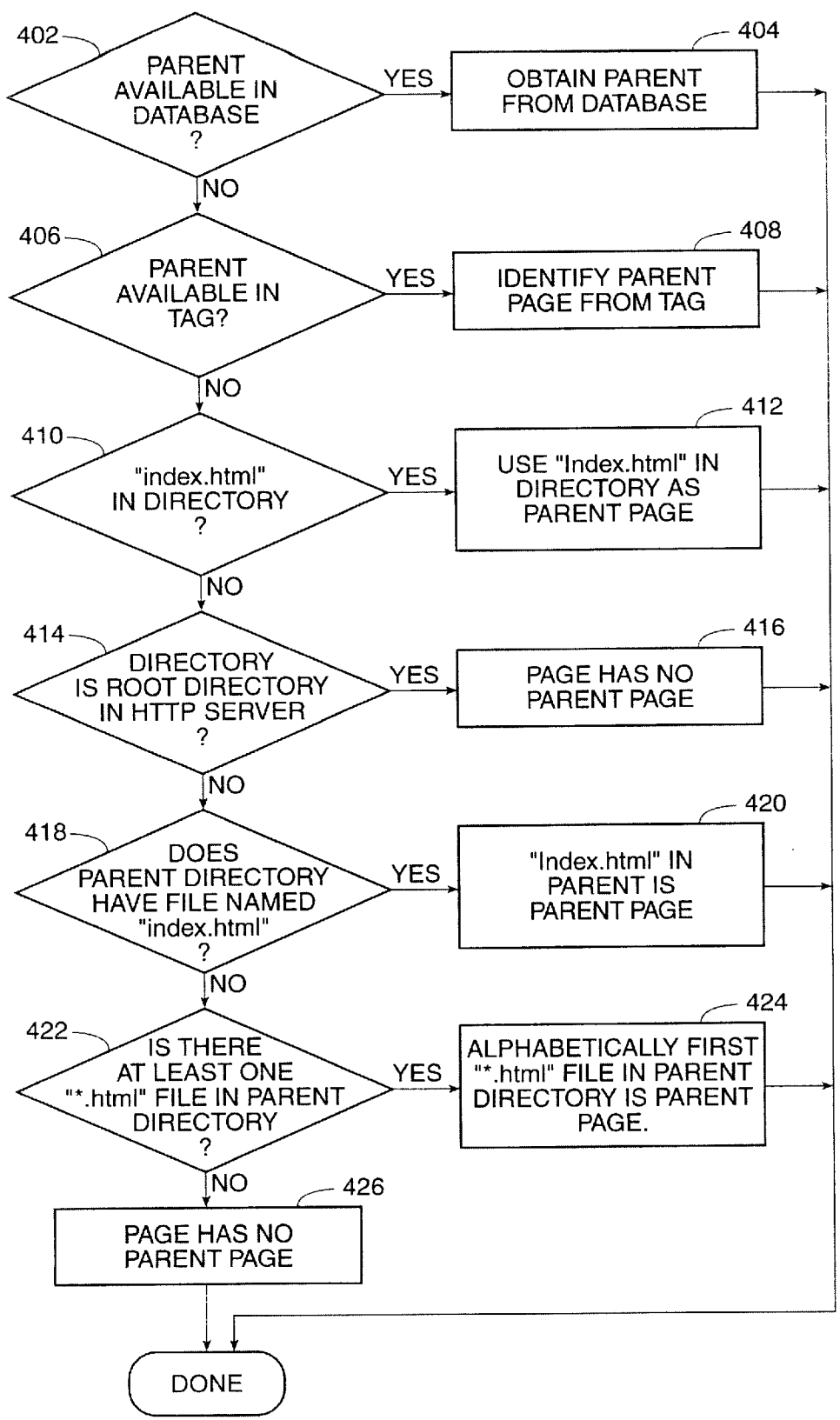
FIG. 4 is a flowchart describing steps of identifying a parent of a selected page of a structured document in accordance with one embodiment of the present invention.

FIG. 4 is a flowchart describing steps of identifying a parent of a selected page of a structured document in accordance with one embodiment of the present invention. At step 402, the document structure database is checked to see if the parent is identified there. If the parent is identified in the document structure database, the identity of the parent is extracted from the database at step 404. If the parent is not identified in the document structure database (or if there is no such database available), the selected page is scanned for the special META tag described above at step 406. If such a tag is available, the identity of the parent is extracted from the tag at step 408.

If such a tag is not available (or if the embodiment does not provide such tags), the next step 410 is to search for a file with a special filename, preferably "index.html" in the same directory as the selected page. This file is normally the master file of the directory (it typically contains home page or index information) and thus may serve as a parent. If such a file is found in the same directory as the selected page, this file is identified to be the parent at step 412. If such a file is not found, at step 414, the directory of the selected page is checked to see if it is in fact the root directory of the hypertext documents served by the HTTP server at host system 10.

If the directory of the selected page is in fact the root directory, the current page is determined at step 416 to have no parent page. If the directory of the selected page is not the root directory, searching for the parent page continues at step 418 where the parent directory of the directory containing the selected page is also checked for the file with the special filename. If this file is found, it is identified to be the parent of the selected page at step 420. If no such file is found, as a fallback the parent directory is searched for any file having a special suffix, preferably ".html", at step 422. If one or more such files are found in the parent directory, the one first in alphabetical order is identified to be the parent at step 424. If no such file is found, the selected page is determined to have no parent page at step 426.

The procedure of FIG. 4 is constructed to maximize the chances of identifying a page that can be said to represent the parent of the selected page even when the document structure is not precisely defined. The procedure for identifying a child page is similar to steps 402 through 406 of FIG. 4. Children are identified from the database if possible, and otherwise from the "child" meta tags if available or as the other files in the same directory as the "index.html" file. In this last case (other files in the same directory), the files are scanned for the presence of a "parent" meta tag. A file is considered to be a child if it either does not have a patent meta tag or has a "parent" meta tag with the value equal to the parent file. Once a first generation parent of a selected page is found, children of the first generation parent are identified in this way to find the siblings of the selected page.

Figure 5:
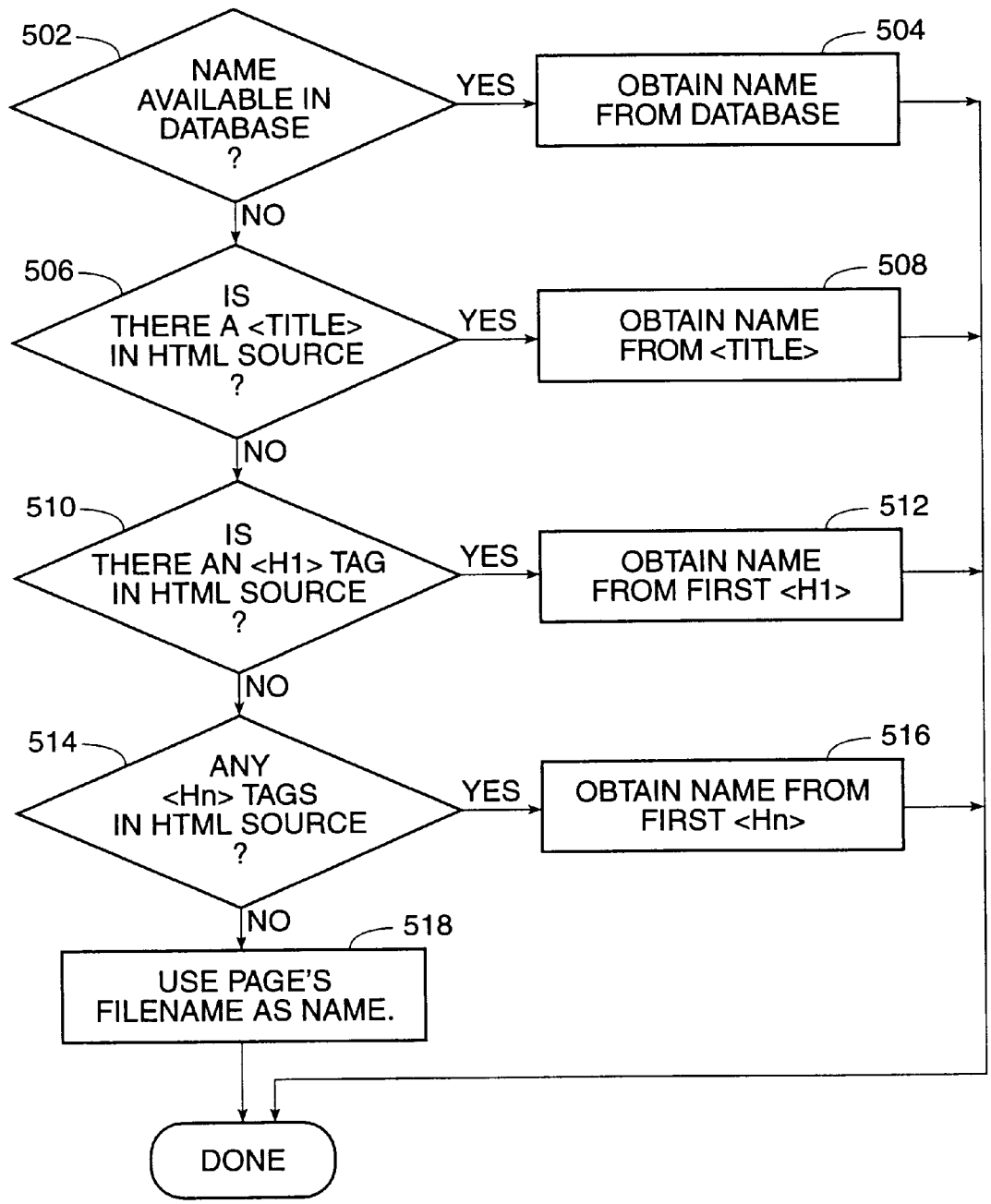
FIG. 5 is a flowchart describing steps of obtaining a name of a selected page of a structured document in accordance with one embodiment of the present invention.

FIG. 5 is a flowchart describing steps of obtaining a name of a selected page of a structured document in accordance with one embodiment of the present invention. At step 502, the document structure database is searched for the name. If the name is found (or if there is no such database in the embodiment), it is extracted from the database at step 504. If the name is not found, the HTML source code for the selected page is searched for a <TITLE> tag at step 506. If the name is found in the <TITLE> tag, it is extracted at step 508. If the name is not found in the database, the HTML source is searched for a first level heading tag, i.e., an <H1> tag at step 510. If such a tag is found, the name is extracted from it at step 512. If such a tag is not found, the HTML source is searched for a heading tag of any level, i.e., an <Hn> tag at step 514. If any such tag is found, the user's name is extracted from the first one in the source at step 516. If no such tag is found, the selected page's file name is identified to be the name at step 518. This procedure maximizes the chances of obtaining a name that characterizes the contents of the page.

Once the parents and siblings of the selected page are identified in accordance with FIG. 4 and their names obtained in accordance with FIG. 5, host system 10 may construct a code segment as in FIG. 3 and concatenate it to the HTML source of the selected page. Host system 10 may then transmit the selected page to a requesting client where it is viewable by any HTML browser. Prior to transmission, host system 10 may remove any special META tags from the HTML source.

In the foregoing specification, the invention has been described with reference to specific exemplary embodiments thereof. It will, however, be evident that various modifications and changes may be made thereunto without departing from the broader spirit and scope of the invention as set forth in the appended claims.

Furthermore, the flowcharts described herein are illustrative of merely the broad logical flow of steps to achieve a method of the present invention and that steps may be added to, or taken away from the flowchart without departing from the scope of the invention. Further, the order of execution of steps in the flowcharts may be changed without departing from the scope of the invention. Additional considerations in implementing the method described by the flowchart may dictate changes in the selection and order of steps.

In general, the flowcharts in this specification include one or more steps performed by software routines executing in a computer system. The routines may be implemented by any means as is known in the art. For example, any number of computer programming languages, such as Java, "C", Pascal, FORTRAN, assembly language, etc., may be used. Further, various programming approaches such as procedural, object oriented or artificial intelligence techniques may be employed.

Many such changes or modifications will be readily apparent to one of ordinary skill in the art. For example, although the described embodiments refer to operation in the context of a network, the present invention will also find application when structured documents are stored and viewed on the same system. Even when implemented in the network context, the present invention is not limited to the WWW, or to HTML documents. The specification and drawings are, accordingly, to be regarded in an illustrative rather than a restrictive sense, the invention being limited only by the provided claims and their full scope of equivalents.

What is claimed is:

1. A computer-implemented method for presenting hypertext page context information comprising:

retrieving a selected hypertext page of a structured document, the hypertext page being an HTML file; and automatically developing information showing a context of said selected hypertext page within said structured document, including:

extracting information identifying a parent of said selected hypertext page from a selected tag within said selected hypertext page; and removing said selected tag from said selected hypertext page.

2. The method of claim 1 wherein said structured document comprises a plurality of pages in the form of HTML files, the pages being in a tree structure wherein each page descends from a root page through one or more parents and said automatically developing step comprises:

automatically developing information identifying parents of said selected hypertext page.

3. The method of claim 2 wherein said automatically developing further comprises:

extracting information identifying a parent of said selected hypertext page from a document structure database of said structured document.

4. The method of claim 2 wherein said hypertext page is stored as a file within a directory structure and wherein said automatically developing step further comprises:

searching for an index file within said directory structure beginning with a directory of said hypertext page file and moving up said directory structure until said index file is found; and identifying said index file to be a parent of said hypertext page.

5. The method of claim 1 wherein said structured document comprises a plurality of pages in the form of HTML files, the pages being in a tree structure wherein each page descends from a root page through one or more parents and said automatically developing step comprises:

automatically developing information identifying other hypertext pages descended from a parent of said selected hypertext page.

6. The method of claim 1 wherein said automatically developing comprises:

developing a name of another hypertext page within said structured document.

7. The method of claim 6 wherein said name is obtained by:

retrieving said name from a document structure database of said structured document.

8. The method of claim 6 wherein said name is obtained by:

extracting a title from said another hypertext page.

9. The method of claim 6 wherein said name is obtained by:

extracting a file name of said another hypertext page.

10. The method of claim 6 wherein said another hypertext page is in HTML format and said name is obtained by:

extracting said name from a heading tag in said another hypertext page.

11. The method of claim 1 further comprising:

inserting said information at the top of said selected hypertext page.

12. The method of claim 11 further comprising:

transmitting said selected hypertext page as modified in said inserting step via a network.

13. The method of claim 1, further comprising:

creating HTML code describing the context; and appending the HTML code to the HTML file describing the hypertext page.

14. The method of claim 1, wherein the structured document is a page on the world wide web.

15. A computer program product for presenting hypertext page context information, said product comprising:

code that retrieves a selected hypertext page of a structured document, the hypertext page being an HTML file;

code that automatically develops information showing a context of said selected hypertext page within said structured document, including code that extracts information identifying a parent of said selected hypertext page from a selected tag within said selected hypertext page and code that removes said selected tag from said selected hypertext page; and a computer-readable medium that stores the codes.

16. The product of claim 15 wherein said structured document comprises a tree structure wherein each page descends from a root page through one or more parents and said automatically developing code comprises:

code that automatically develops information identifying parents of said selected hypertext page.

17. The product of claim 16 wherein said automatically developing code further comprises:

code that extracts information identifying a parent of said selected hypertext page from a table-of-contents database of said structured document.

18. The product of claim 16 wherein said hypertext page is stored as a file within a directory structure and wherein said automatically developing code further comprises:

code that searches for an index file within said directory structure beginning with a directory of said hypertext page file and moving up said directory structure until said index file is found; and code that identifies said index file to be a parent of said hypertext page.

19. The product of claim 15 wherein said structured document comprises a tree structure wherein each page descends from a root page through one or more parents and said automatically developing code comprises:

code that automatically develops information identifying other hypertext pages descended from a parent of said selected hypertext page.

20. The product of claim 15 wherein said automatically developing code comprises:

code that obtains a name of another hypertext page within said selected document.

21. The product of claim 20 wherein said name obtaining code comprises:

code that retrieves said name from a document structure database of said structured document.

22. The product of claim 20 wherein said name obtaining code comprises:

code that extracts a title from said another hypertext page.

23. The product of claim 20 wherein said name obtaining code comprises:

code that extracts a file name of said another hypertext page.

24. The product of claim 20 wherein said another hypertext page is in HTML format and said name obtaining code comprises:

code that extracts a heading tag from said another hypertext page.

25. The product of claim 15 further comprising:

code that inserts said information at the top of said selected hypertext page.

26. The product of claim 25 further comprising:

code that transmits said selected hypertext page as modified by said inserting code via a network.

* * * * *